(12) United States Patent
Shikama et al.

(10) Patent No.: US 12,407,930 B2
(45) Date of Patent: Sep. 2, 2025

(54) IMAGE PICKUP APPARATUS, CAMERA AND MOBILE ELECTRONIC DEVICE

(71) Applicant: AAC Optics (Nanning) Co., Ltd., Guangxi (CN)

(72) Inventors: Kazuo Shikama, Osaka (JP); Takashi Iwasaki, Osaka (JP)

(73) Assignee: AAC Optics (Nanning) Co., Ltd., Nanning (CN)

( * ) Notice: Subject to any disclaimer, the term of this patent is extended or adjusted under 35 U.S.C. 154(b) by 206 days.

(21) Appl. No.: 18/327,898

(22) Filed: Jun. 2, 2023

(65) Prior Publication Data

US 2023/0403468 A1 Dec. 14, 2023

(30) Foreign Application Priority Data

Jun. 8, 2022 (JP) .................. 2022-092882

(51) Int. Cl.
*H04N 23/68* (2023.01)
*G02B 7/04* (2021.01)
*G02B 7/08* (2021.01)
*G02B 7/10* (2021.01)
*H04N 23/55* (2023.01)

(52) U.S. Cl.
CPC ........... *H04N 23/687* (2023.01); *H04N 23/55* (2023.01)

(58) Field of Classification Search
CPC ...... H04N 23/55; H04N 23/687; H04N 23/54; H04N 23/57; H04N 23/646; H04N 23/683; G02B 27/646; G02B 7/04; G02B 7/08; G02B 7/102

See application file for complete search history.

(56) References Cited

U.S. PATENT DOCUMENTS

| | | | | |
|---|---|---|---|---|
| 2019/0271855 A1* | 9/2019 | Hu | ........................ | G02B 27/646 |
| 2022/0094853 A1* | 3/2022 | Xu | ......................... | H04N 23/54 |
| 2023/0188852 A1* | 6/2023 | Xu | ....................... | H04N 23/683 |
| 2024/0340519 A1* | 10/2024 | Huang | .................. | G02B 7/023 |

FOREIGN PATENT DOCUMENTS

| | | |
|---|---|---|
| CN | 105022204 A | 11/2015 |
| JP | 2020060726 A | 4/2020 |
| WO | 2018061455 A1 | 4/2018 |
| WO | 2021020445 A1 | 2/2021 |

* cited by examiner

*Primary Examiner* — Marly S Camargo
(74) *Attorney, Agent, or Firm* — Wiersch Law Group

(57) ABSTRACT

The present invention discloses an image pickup apparatus, a camera and a mobile electronic device. The image pickup apparatus comprises a housing; a movable component and a fixed component, the fixed component comprising a lens with an optical axis, and the movable component comprising a moving frame and a sensor component; a first connector movably connecting the movable component with the fixed component; a first driving component used for driving the movable component to move in a direction perpendicular to the optical axis; a second connector movably connecting the moving frame with the sensor component; and a second driving component used for driving the sensor component to move in the direction of the optical axis. The image pickup apparatus coincides with the development direction of "miniaturization", and facilitates optical axis alignment during assembly, thus improving the image pickup quality of the image pickup apparatus.

13 Claims, 12 Drawing Sheets

IMAGE PICKUP APPARATUS, CAMERA AND MOBILE ELECTRONIC DEVICE

TECHNICAL FIELD

The present invention relates to the field of optical technology, in particular to an image pickup apparatus, a camera and a mobile electronic device.

BACKGROUND

With the rapid development of science and technology, driving mechanisms for driving lens bodies to move are widely used in various image pickup apparatuses, and the image pickup apparatuses are also widely used in various mobile electronic devices. Here, the driving mechanism of the image pickup apparatus is usually used for driving the lens body to move on an optical axis or even on a plane perpendicular to the optical axis.

The existing driving mechanisms typically comprise coils and magnets. The coil is fixed on a circumference of a lens body frame, so that after the coil is electrified to generate a magnetic field, the lens body moves under an electromagnetic force on the optical axis to realize a focusing function, and the lens body can even move on the plane perpendicular to the optical axis to realize an anti-shake function.

At present, in case where an optical system has a long total optical length or a glass lens body is adopted to improve the image pickup quality of an image pickup apparatus, the weight of the lens body will be greatly improved. In this case, when the lens body is driven to move by the driving mechanism, the driving mechanism needs to provide a large driving force to be able to drive the heavy lens body to move. Thus, it is necessary to make the driving mechanism and even the image pickup apparatus as large as possible, which is inconsistent with the current development direction of "miniaturization" of image pickup apparatuses.

In addition, in the existing driving mechanism, a focusing drive is arranged in the lens, an anti-shake drive is arranged in a sensor, and it is difficult to align the lens, the focusing drive and the anti-shake drive during assembly, which reduces the optical performance.

Therefore, an image pickup apparatus which coincides with the development direction of "miniaturization", and also facilitates optical axis alignment during assembly is urgently needed.

SUMMARY

The present invention aims to provide an image pickup apparatus, a camera and a mobile electronic device. The image pickup apparatus coincides with the development direction of "miniaturization", and also facilitates optical axis alignment during assembly, thus improving the image pickup quality of the image pickup apparatus.

According to the technical scheme of the present invention, an image pickup apparatus comprises a housing with an accommodating space; a movable component accommodated in the housing and a fixed component at least partially accommodated in the housing, the fixed component comprising a lens with an optical axis, and the movable component comprising a moving frame and a sensor component movably connected with the moving frame; a first connector movably connecting the movable component with the fixed component; a first driving component used for driving the movable component to move in a direction perpendicular to the optical axis; a second connector movably connecting the moving frame with the sensor component; and a second driving component used for driving the sensor component to move in the direction of the optical axis.

In some embodiments, the first driving component drives the movable component to move along a first axis and a second axis perpendicular to the optical axis, and the first axis and the second axis are perpendicular to each other.

In some embodiments, the first driving component drives the movable component to rotate relative to the fixed component in the direction of the optical axis.

In some embodiments, the housing comprises an upper housing and a lower housing which cooperate to form the accommodation space, the fixed component comprises a base fixed to the lower housing, the first driving component is a voice coil motor and comprises a first coil and a first magnet, the first coil is arranged on the moving frame, and the first magnet is arranged on the base.

In some embodiments, the second driving component drives the sensor component to rotate around a first axis and a second axis, and the first axis and the second axis are perpendicular to each other and both perpendicular to the optical axis.

In some embodiments, the second driving component comprises four second drive actuators, each second drive actuator comprises a third driver and a fourth driver arranged on the housing, and the fourth driver is used for allowing the third driver to move in a direction close to/away from the fourth driver; and the sensor component has two opposite first side edges and two opposite second side edges, each of the first side edges and each of the second side edges are each provided with one said third driver, the two first side edges are sequentially arranged on the first axis, and the two second side edges are sequentially arranged on the second axis.

In some embodiments, the fixed component comprises a lens holder for accommodating at least part of the lens, the second driving component is a voice coil motor and comprises a second coil and a second magnet, the second coil is arranged on the sensor component, and the second magnet is arranged on the lens holder.

In some embodiments, the moving frame comprises a moving piece and an anti-shake coil board fixedly connected with the moving piece, and the first connector is a ball and arranged between the moving piece and the base.

In some embodiments, the sensor component comprises an optical filter close to the lens and a sensor circuit board spaced apart from the optical filter, the second connector is a leaf spring, and two ends of the second connector are respectively connected with the anti-shake coil board and the sensor circuit board.

In some embodiments, the image pickup apparatus further comprises a multi-segment accommodating zoom mechanism fixed on the housing.

In some embodiments, the image pickup apparatus further comprises a reflection mechanism fixed on the housing, wherein the lens changes an optical path through the reflection mechanism.

In some embodiments, the image pickup apparatus further comprises an aperture mechanism fixed on the housing and used for adjusting a light inlet amount of the lens.

In some embodiments, the present invention also provides a camera, which comprises the image pickup apparatus.

In some embodiments, the present invention also provides a mobile electronic device, which comprises the camera.

The present invention has the following advantages: to realize the focusing function of the image pickup apparatus, the movable component can be driven through the first driving component to move in the direction of the optical axis, and to realize the anti-shake function of the image pickup apparatus, the sensor component can be driven through the second driving component to move in the direction perpendicular to the optical axis; because for the image pickup apparatus of the present invention, the sensor component with lighter weight instead of a lens body of the lens with heavier weight needs to be driven to move, the first driving component and the second driving component can be miniaturized, so that the image pickup apparatus can be miniaturized too; further, optical axis alignment can be realized easily during assembly, thus improving the image pickup quality of the image pickup apparatus.

Figure 1:
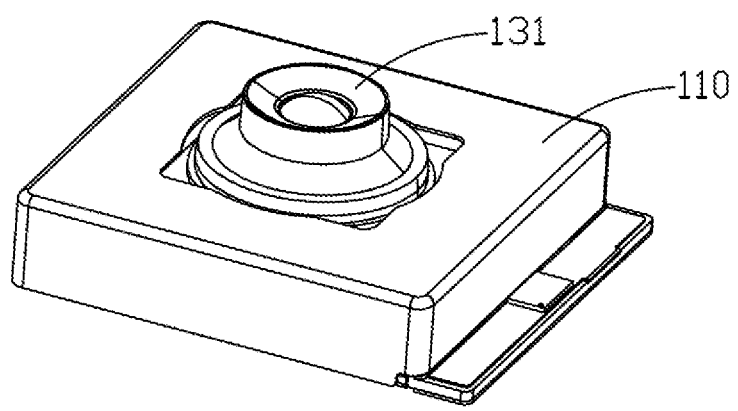
FIG. 1 is a structural diagram of an image pickup apparatus provided by some embodiments of the present invention.

DESCRIPTION OF REFERENCE NUMERALS housing 110, upper housing 111, lower housing 112;
movable component 120, movable frame 121, first side 101, second side 102, third side 103, fourth side 104, sensor component 122, first side edge 123, second side edge 124, moving piece 125, anti-shake coil board 126, optical filter 127, sensing circuit board 128, first anti-shake adhesive 129;
fixed component 130, lens 131, base 132, lens holder 133, second anti-shake adhesive 134;
first connector 140, first support plate 141, second support plate 142;
first driving component 150, first drive actuator 151, first driver 152, second driver 153, first magnetic yoke 154;
second connector 160;
second driving component 170, second drive actuator 171, third driver 172, fourth driver 173, second magnetic yoke 174;
multi-segment accommodating zoom mechanism 180;
reflection mechanism 190;
aperture mechanism 200;
flexible circuit board 210;
position detection member 220;
mobile electronic device 230;
camera 240.

DETAILED DESCRIPTION OF EMBODIMENTS

The present invention will be further described below with reference to the accompanying drawings and embodiments.

Referring to FIGS. 1-9, in some embodiments, the present invention provides an image pickup apparatus, comprising: a housing 110 with an accommodating space; a movable component 120 accommodated in the housing 110 and a fixed component 130 at least partially accommodated in the housing 110, the fixed component 130 comprising a lens 131 with an optical axis, and the movable component 120 comprising a moving frame 121 and a sensor component 122 movably connected with the moving frame 121; a first connector 140 movably connecting the movable component 120 with the fixed component 130; a first driving component 150 used for driving the movable component 120 to move in a direction perpendicular to the optical axis; a second connector 160 movably connecting the moving frame 121 with the sensor component 122; and a second driving component 170 used for driving the sensor component 122 to move in the direction of the optical axis.

Specifically, the fixed component 130 being at least partially accommodated in the housing 110 means that the whole fixed component 130 can be accommodated in the housing 110, or part of the fixed component 130 can be accommodated in the housing 110. It should be noted that the specific arrangement of the fixed component 130 is not limited by the present invention, as long as an optical image signal transmitted through the lens 131 of the fixed component 130 can be irradiated to an imaging surface of the sensor component 122, so that the sensor component 122 can convert the optical image signal into an electrical signal.

The movable component 120 is accommodated in the housing 110, so that the housing 110 comprehensively protect the movable component 120 with the sensor component 122, thus preventing the sensor component 122 from being damaged due to collision with other parts.

Because the first connector 140 movably connects the movable component 120 with the fixed component 130, the first driving component 150 can drive the movable component 120 to move relative to the fixed component 130 in a direction perpendicular to the optical axis, so that the image pickup apparatus can realize the anti-shake function when the first driving component 150 drives the movable component 120 with the sensor component 122 to move in the direction perpendicular to the optical axis. It should be noted that how exactly the movable component 120 and the fixed component 130 are movably connected by the first connector 140 is not limited by the present invention.

Because the second connector 160 movably connects the moving frame 121 with the sensor component 122, when the second driving component 170 drives the sensor component 122 to move in the direction of the optical axis, the sensor component 122 can move in the direction of the optical axis relative to the moving frame 121, so that the sensor component 122 can move in the direction of the optical axis relative to the fixed component 130 with the lens 131, and the image pickup apparatus can realize the focusing function when the second driving component 170 drives the sensor component 122 to move in the direction of the optical axis. It should be noted that how exactly the moving frame 121 and the sensor component 122 are movably connected by the second connector 160 is not limited by the present invention.

In this way, when the image pickup apparatus provided by the present invention is used, the anti-shake function of the image pickup apparatus can be realized by making the first driving component 150 drive the movable component 120 to move in the direction perpendicular to the optical axis, so that the sensor component 122 of the movable component 120 can move in the direction perpendicular to the optical axis; and the focusing function of the image pickup apparatus can be realized by making the second driving component 170 drive the sensor component 122 to move in the direction of the optical axis.

Because for the image pickup apparatus of the present invention, the light movable component 120 with the sensor component 122 is driven to move and the sensor component 122 is directly driven to move, instead of driving a lens body in the heavy lens 131 to move, the first driving component 150 and the second driving component 170 can make the image pickup apparatus have anti-shake and focusing functions without providing a large driving force, so that the first driving component 150 and the second driving component 170 can be miniaturized, and then the image pickup apparatus can be miniaturized too. Moreover, during the driving process of the first driving component 150 and the second driving component 170, because the first driving component 150 and the second driving component 170 do not drive the lens body in the heavy lens 131 to move, the lens body in the lens 131 can be prevented from shaking during focusing of the image pickup apparatus, thereby improving the image pickup quality of the image pickup apparatus.

In addition, since in the present invention, the anti-shake and focusing functions are integrated on the sensor component 122, that is, the anti-shake and focusing functions are realized by driving the sensor component 122 to move, the difficulty of aligning the lens 131, a focusing drive and an anti-shake drive can be reduced when assembling the image pickup apparatus.

Still referring to FIGS. 1-9, in some embodiments, the first driving component 150 drives the movable component 120 to move along a first axis and a second axis perpendicular to the optical axis, and the first axis and the second axis are perpendicular to each other.

Specifically, the first driving component 150 driving the movable component 120 to move along the first axis and the second axis perpendicular to the optical axis means that the first driving component 150 can not only drive the movable component 120 to move along the first axis perpendicular to the optical axis so that the movable component 120 with the sensor component 122 moves along the first axis relative to the fixed component 130 with the lens 131, but also drive the movable component 120 to move along the second axis perpendicular to the optical axis, so that the movable component 120 with the sensor component 122 moves along the second axis relative to the fixed component 130 with the lens 131. In this way, when the image pickup apparatus is used, the first driving component 150 can be used for driving the movable component 120 with the sensor component 122 to move along the first axis and the second axis, so as to realize the anti-shake function of the image pickup apparatus.

In addition, while the first driving component 150 drives the movable component 120 to move along the first axis, the first driving component 150 can also drive the movable component 120 to move along the second axis, so that the movable component 120 can move in any direction perpendicular to the optical axis under the driving of the first driving component 150, which improves the anti-shake effect of the image pickup apparatus.

Still referring to FIGS. 1-9, in some embodiments, the first driving component 150 drives the movable component 120 to rotate relative to the fixed component 130 in the direction of the optical axis.

Specifically, the first driving component 150 driving the movable component 120 to rotate relative to the fixed component 130 around the optical axis means that the first driving component 150 can drive the movable component 120 to rotate on a plane perpendicular to the optical axis. In this way, when the image pickup apparatus is used, the first driving component 150 can be used for making the movable component 120 with the sensor component 122 rotate relative to the fixed component 130 around the optical axis, thereby further improving the anti-shake effect of the image pickup apparatus.

Still referring to FIGS. 1-9, in some embodiments, the first driving component 150 comprises four first drive actuators 151, each first drive actuator 151 comprises a first driver 152 and a second driver 153 arranged on the housing 110, and the second driver 153 is used for moving the first driver 152 in a direction perpendicular to the optical axis but not intersecting with the optical axis; and the moving frame 121 is in a square plate shape, and has a first side 101, a second side 102, a third side 103 and a fourth side 104 connected end to end, the first side 101 is provided with one first driver 152 at a position near the second side 102, the second side 102 is provided with one first driver 152 at a position near the third side 103, the third side 103 is provided with one first driver 152 at a position near the fourth side 104, and the fourth side 104 is provided with one first driver 152 at a position near the first side 101.

Figure 10:
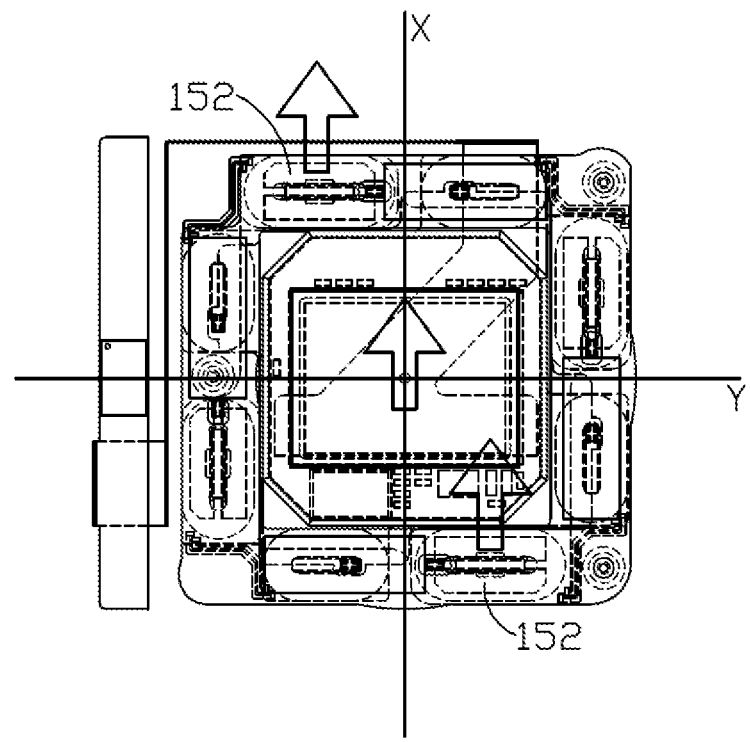
FIG. 10 is a diagram showing a first driving component, driving a movable component to move along a first axis, of an image pickup apparatus provided by some embodiments of the present invention.

In this way, still referring to FIGS. 1-9 and also referring to FIG. 10, the first driver 152 arranged on the first side 101 and the first driver 152 arranged on the third side 103 are driven to move in a direction (that is, the direction indicated by the arrows drawn at the two first drivers 152 in FIG. 10) parallel to the first axis (that is, the X axis in FIG. 10) by two second drivers 153 respectively corresponding to the first driver 152 arranged on the first side 101 and the first driver 152 arranged on the third side 103 (that is, the two first drivers 152 in FIG. 10), that is, the moving frame 121 moves along the first axis, and the sensor component 122 is driven by the movement of the moving frame 121 to move along the first axis.

Figure 11:
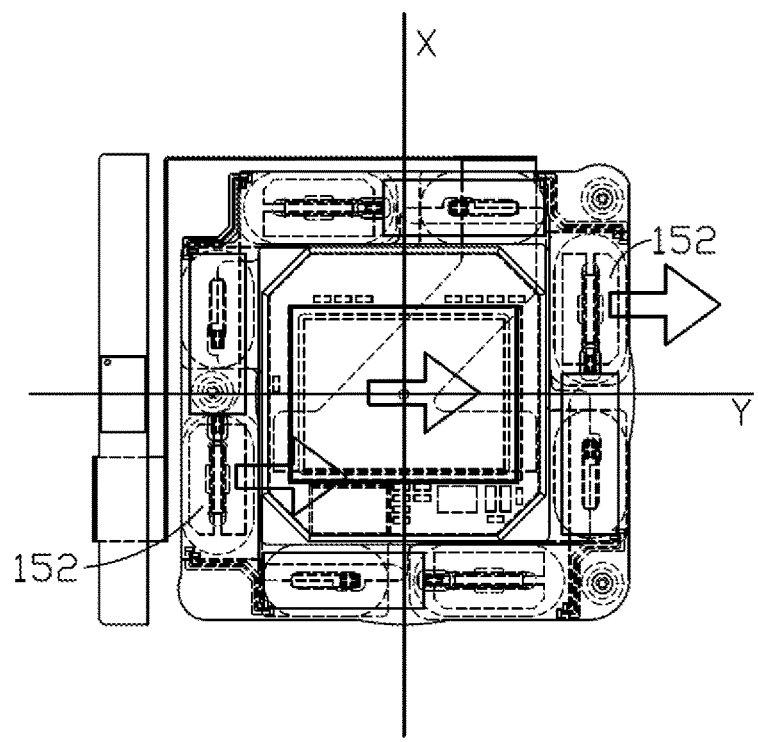
FIG. 11 is a diagram showing a first driving component, driving a movable component to move along a second axis, of an image pickup apparatus provided by some embodiments of the present invention.

Still referring to FIGS. 1-9 and also referring to FIG. 11, the first driver 152 arranged on the second side 102 and the first driver 152 arranged on the fourth side 104 are driven to move in a direction (that is, the direction indicated by the arrows drawn at the two first drivers 152 in FIG. 11) parallel to the second axis (that is, the Y axis in FIG. 11) by two second drivers 153 respectively corresponding to the first driver 152 arranged on the second side 102 and the first driver 152 arranged on the fourth side 104 (that is, the two first drivers 152 in FIG. 11), that is, the moving frame 121 moves along the second axis, and the sensor component 122 is driven by the movement of the moving frame 121 to move along the second axis.

In addition, the four second drivers 153 can simultaneously drive the four first drivers 152 respectively arranged on the four sides to move in a direction close to or away from the optical axis, so that the moving frame 121 rotates, and the sensor component 122 is driven by the rotation of the moving frame 121 to rotate.

Figure 12:
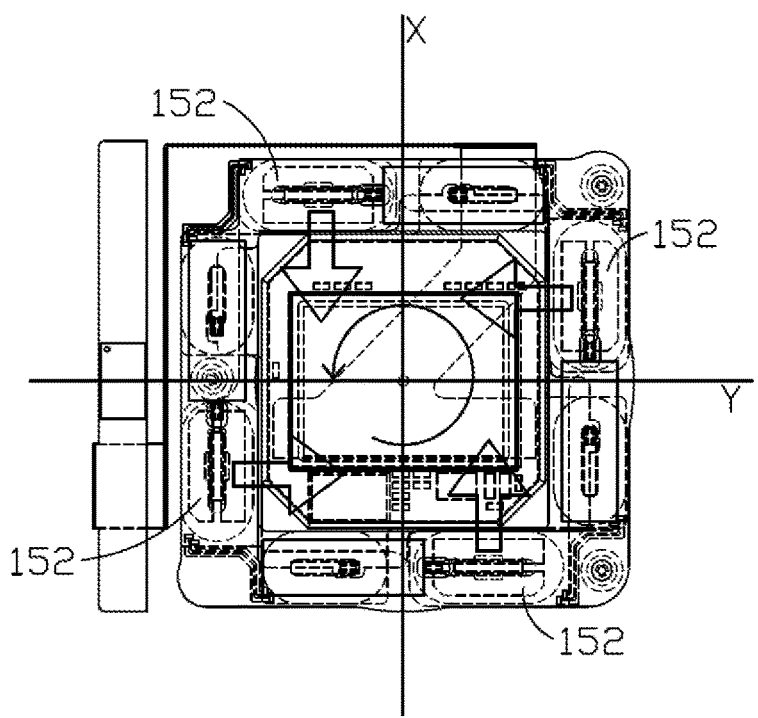
FIG. 12 is a diagram showing a first driving component, driving a movable component to rotate counterclockwise around a first axis, of an image pickup apparatus provided by some embodiments of the present invention.

Specifically, still referring to FIGS. 1-9 and also referring to FIG. 12, the four second drivers 153 simultaneously drive the four first drivers 152 respectively arranged on the four sides to move in the direction close to the optical axis (that is, the direction indicated by the arrows drawn at the four first drivers 152 in FIG. 12), so that the moving frame 121 rotates counterclockwise, and the sensor component 122 is driven by the counterclockwise rotation of the moving frame 121 to rotate counterclockwise.

Figure 13:
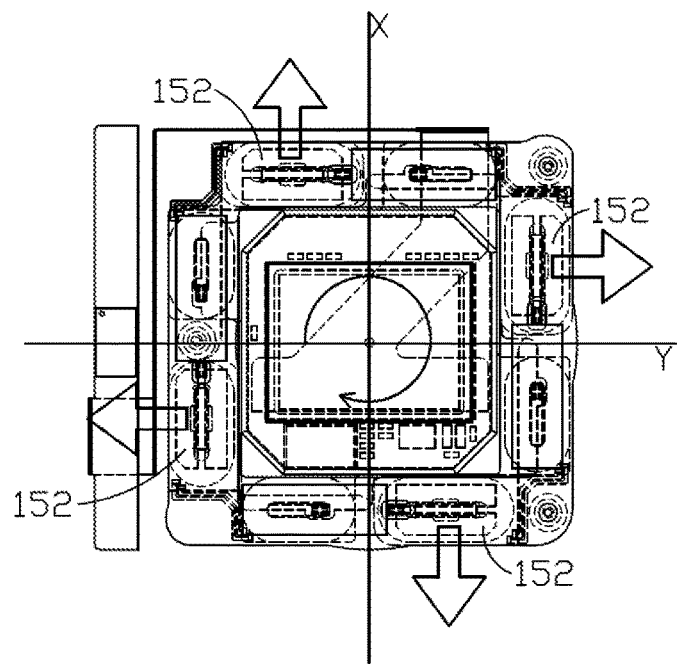
FIG. 13 is a diagram showing a first driving component, driving a movable component to rotate clockwise around a first axis, of an image pickup apparatus provided by some embodiments of the present invention.

Still referring to FIGS. 1-9 and also referring to FIG. 13, the four second drivers 153 simultaneously drive the four first drivers 152 respectively arranged on the four sides to move in the direction away from the optical axis (that is, the direction indicated by the arrows drawn at the four first drivers 152 in FIG. 13), so that the moving frame 121 rotates clockwise, and the sensor component 122 is driven by the clockwise rotation of the moving frame 121 to rotate clockwise.

Still referring to FIGS. 1-9, in some embodiments, the housing 110 comprises an upper housing 111 and a lower housing 112 which cooperate to form the accommodation space, the fixed component 130 comprises a base 132 fixed to the lower housing 112, the first driving component 150 is a voice coil motor and comprises a first coil and a first magnet, the first coil is arranged on the moving frame 121, and the first magnet is arranged on the base 132.

In some embodiments, the first magnet comprises two first magnetic blocks arranged in sequence in a driving direction of the voice coil motor (that is, the direction perpendicular to the optical axis), the N pole and S pole of any one of the two first magnetic blocks are arranged in sequence in the direction of the optical axis, and the two first magnetic blocks have opposite magnetisms.

In some embodiments, the base 132 is provided with positioning grooves in one-to-one correspondence to the first magnets, and the positioning grooves are used for accommodating the first magnets so that the first magnets are arranged on the base 132.

In some embodiments, the first driving component 150 comprises a plurality of first drive actuators 151. The first drive actuator 151 comprises a first driver 152 and a second driver 153. When the first driving component 150 is a voice coil motor, that is, when the first drive actuator 151 is a voice coil motor, the first driver 152 is one of the first coil and the first magnet, and the second driver 153 is the other of the first coil and the first magnet. Further, the first drive actuator 151 further comprises a first magnetic yoke 154 which is arranged opposite to the first magnet. When a coil of the voice coil motor is electrified, because the position of the magnet is fixed, the magnetic field generated by the magnet and the magnetic field generated when the coil is electrified can be used for making the coil move in a direction away from/close to the magnet (that is, the driving direction of the voice coil motor); and when the coil of the voice coil motor is not electrified, because the position of the magnet is fixed, the magnetic field generated by the magnet and the magnetic field generated by the magnetic yoke can be used for making the magnetic yoke move in the direction close to the magnet, so as to realize position recovery.

Still referring to FIGS. 1-9, in some embodiments, the second driving component 170 drives the sensor component 122 to rotate around the first axis and the second axis. Specifically, the second driving component 170 driving the sensor component 122 to rotate around the first axis and the second axis means that the second driving component 170 can drive the sensor component 122 to rotate around the first axis and the second driving component 170 can also drive the sensor component 122 to rotate around the second axis. In this way, when the image pickup apparatus is used, the second driving component 170 can be used for driving the sensor component 122 to rotate around the first axis and the second axis, so as to realize the anti-shake function of the image pickup apparatus.

Still referring to FIGS. 1-9, in some embodiments, the second driving component 170 comprises four second drive actuators 171, each second drive actuator 171 comprises a third driver 172 and a fourth driver 173 arranged on the housing 110, and the fourth driver 173 is used for allowing the third driver 172 to move in a direction close to/away from the fourth driver 173; and the sensor component 122 has two opposite first side edges 123 and two opposite second side edges 124, each of the first side edges 123 and each of the second side edges 124 are each provided with one said third driver 172, the two first side edges 123 are sequentially arranged on the first axis, and the two second side edges 124 are sequentially arranged on the second axis.

Figure 14:
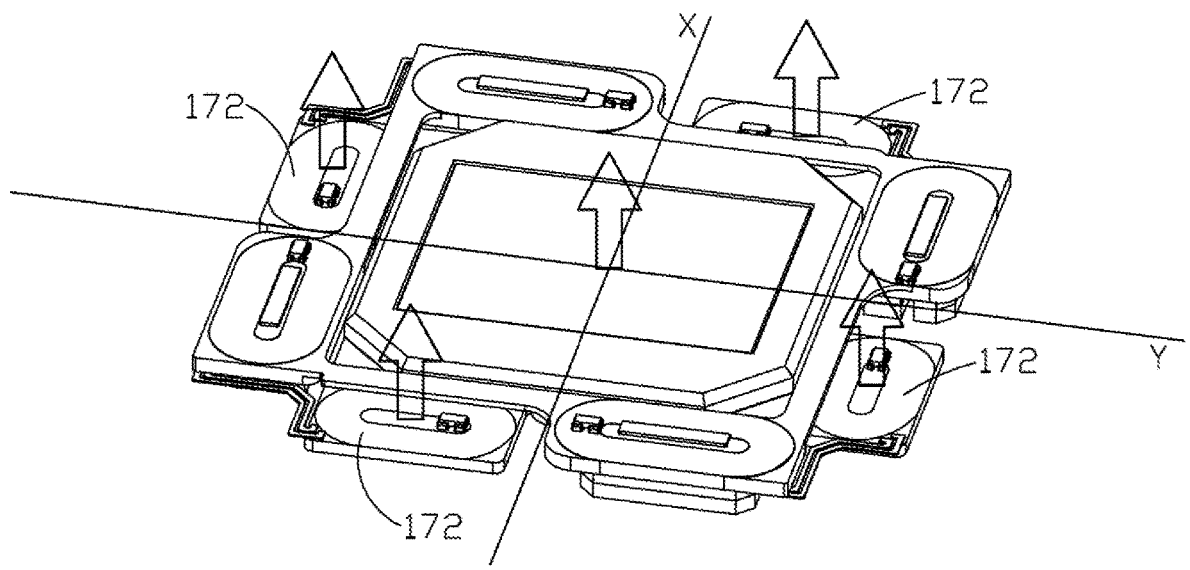
FIG. 14 is a diagram showing a second driving component of an image pickup apparatus provided by some embodiments of the present invention driving a sensor component to move in the direction of an optical axis.

In this way, still referring to FIGS. 1-9 and also referring to FIG. 14, when the sensor component 122 needs to be driven by the second driving component 170 to move in the direction of the optical axis, the four third drivers 172 can be driven by the four fourth drivers 173 to move in the direction of the optical axis (that is, the direction indicated by the arrows drawn at the four third drivers 172 in FIG. 14). In this way, the focusing function of the image pickup apparatus is realized.

Figure 15:
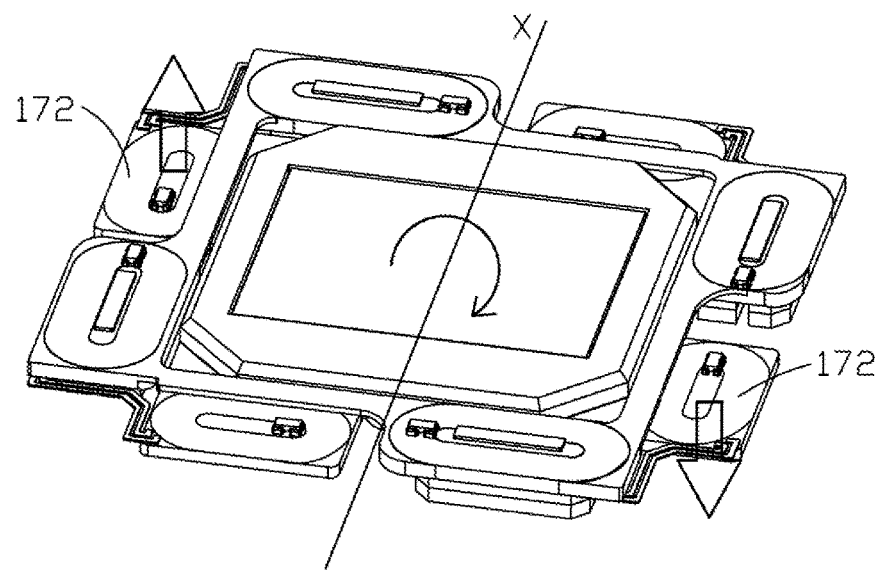
FIG. 15 is a diagram showing a second driving component, driving a sensor component to rotate around a first axis, of an image pickup apparatus provided by some embodiments of the present invention.

Still referring to FIGS. 1-9 and also referring to FIG. 15, when the sensor component 122 needs to be driven to rotate around the first axis (that is, the X axis in FIG. 15) by the second driving component 170, the third drivers 172 respectively arranged on the two second side edges 124 (that is, the two third drivers 172 in FIG. 15) can be driven to move in opposite directions (that is, the directions indicated by the arrows drawn at the two third drivers 172 respectively in FIG. 15) by the two fourth drivers 173 respectively corresponding to the third drivers 172 respectively arranged on the two second side edges 124.

Figure 16:
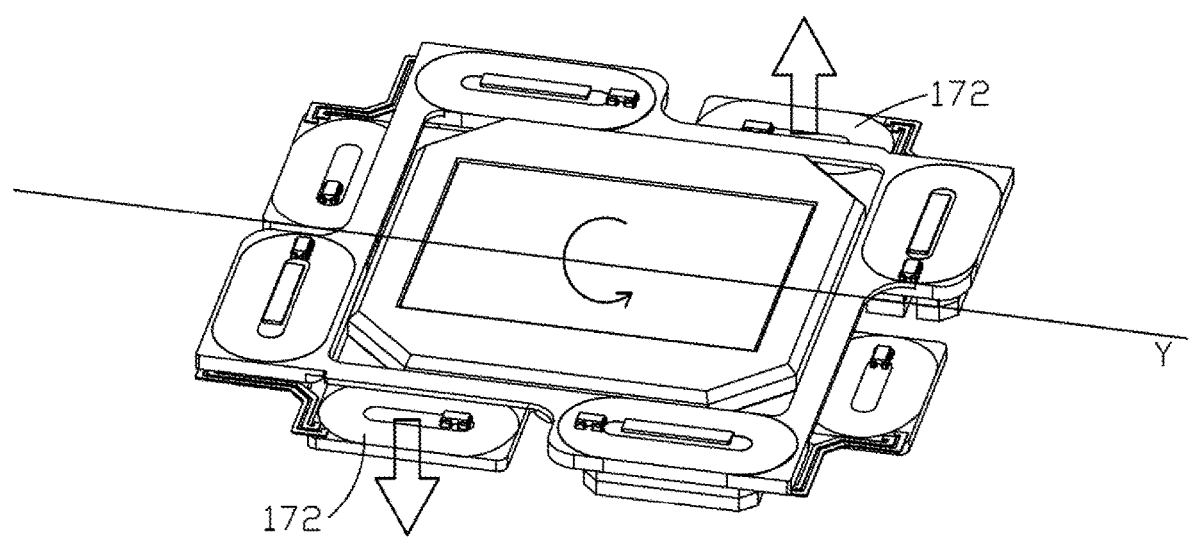
FIG. 16 is a diagram showing a second driving component, driving a sensor component to rotate around a second axis, of an image pickup apparatus provided by some embodiments of the present invention.

Still referring to FIGS. 1-9 and also referring to FIG. 16, when the sensor component 122 needs to be driven by the second driving component 170 to rotate around the second axis (that is, the Y axis in FIG. 16), the third drivers 172 respectively arranged on the two first side edges 124 (that is, the two third drivers 172 in FIG. 16) can be driven to move in opposite directions (that is, the directions indicated by the arrows drawn at the two third drivers 172 respectively in FIG. 16) by the two fourth drivers 173 respectively corresponding to the third drivers 172 respectively arranged on the two first side edges 124. In this way, the anti-shake effect of the image pickup apparatus can be further improved.

Still referring to FIGS. 1-9, in some embodiments, the third driver 172 and the fourth driver 173 are sequentially arranged in a direction parallel to the optical axis. In this way, the direction of a driving force provided by the second drive actuator 171 can be made parallel to the optical axis, thereby facilitating the anti-shake function of the image pickup apparatus.

Still referring to FIGS. 1-9, in some embodiments, the fixed component 130 comprises a lens holder 133 for accommodating at least part of the lens 131, the second driving component 170 is a voice coil motor and comprises a second coil and a second magnet, the second coil is arranged on the sensor component 122, and the second magnet is arranged on the lens holder 133.

In some embodiments, the second magnet comprises a second magnetic block, and the N pole and the S pole of the second magnetic block are sequentially arranged in the direction parallel to the optical axis.

In some embodiments, the lens holder 133 is provided with limiting grooves in one-to-one correspondence to the second magnets, and the limiting grooves are used for accommodating the second magnets so that the second magnets are arranged on the lens holder 133.

In some embodiments, the second driving component 170 comprises a plurality of second drive actuators 171, and the second drive actuator 171 comprises a third driver 172 and a fourth driver 173. When the second driving component 170 is a voice coil motor, that is, when the second drive actuator 171 is a voice coil motor, the third driver 172 is one of the second coil and the second magnet, and the fourth driver 173 is the other of the second coil and the second magnet. Further, the second drive actuator 171 further comprises a second magnetic yoke 174 arranged on the second coil.

Still referring to FIGS. 1-9, in some embodiments, the first driving component 150 and the second driving component 170 are staggered in the direction parallel to the optical axis. In this way, the first driving component 150 and the second driving component 170 may overlap in the direction perpendicular to the optical axis, thereby increasing the utilization rate of the space in the housing 110.

Still referring to FIGS. 1-9, in some embodiments, the moving frame 121 comprises a moving piece 125 and an anti-shake coil board 126 fixedly connected with the moving piece 125. The first connector 140 is a ball and arranged between the moving piece 125 and the base 132. In this way, the moving piece 125 can slide in any direction perpendicular to the optical axis relative to the housing 110, and the moving piece 125 can rotate around the optical axis.

In some embodiments, the first magnetic yoke 154 is arranged on the moving piece 125.

In some embodiments, the image pickup apparatus further comprises a first support plate 141 fixed on the moving piece 125 and a second support plate 142 fixed on the base 132, and the first support plate 141 and the second support plate 142 are opposite on two sides of the ball and are slidably connected with the ball.

Still referring to FIGS. 1-9, in some embodiments, the sensor component 122 comprises an optical filter 127 close to the lens 131 and a sensor circuit board 128 spaced apart from the optical filter 127, the second connector 160 is a leaf spring, and two ends of the second connector are respectively connected with the anti-shake coil board 126 and the sensor circuit board 128.

In this way, the sensor circuit board 128 can move along the optical axis and rotate around the first axis and the second axis. It should be noted that in other embodiments, the second connector 160 can also be a spring and other elements that can be elastically deformed, which is not limited by the present invention. It should also be noted that the specific number of the second connectors 160 is not limited in the present invention.

In some embodiments, the optical filter 127 can be fixed on the sensor circuit board 128 by gluing, screwing and other fixing methods.

In some embodiments, the third driver 172 is arranged on the sensor circuit board 128.

In some embodiments, the moving frame 121 is coated with a first anti-shake adhesive 129. The first anti-shake glue 129 can suppress the shaking of the image pickup apparatus under abrupt electrification, thus achieving the anti-shake effect, and further improving the anti-shake effect of the image pickup apparatus.

In some embodiments, the base 132 is coated with a second anti-shake adhesive 134. The second anti-shake adhesive 134 can also suppress the shaking of the image pickup apparatus under abrupt electrification, thus achieving the anti-shake effect, and further improving the anti-shake effect of the image pickup apparatus.

Figure 2:
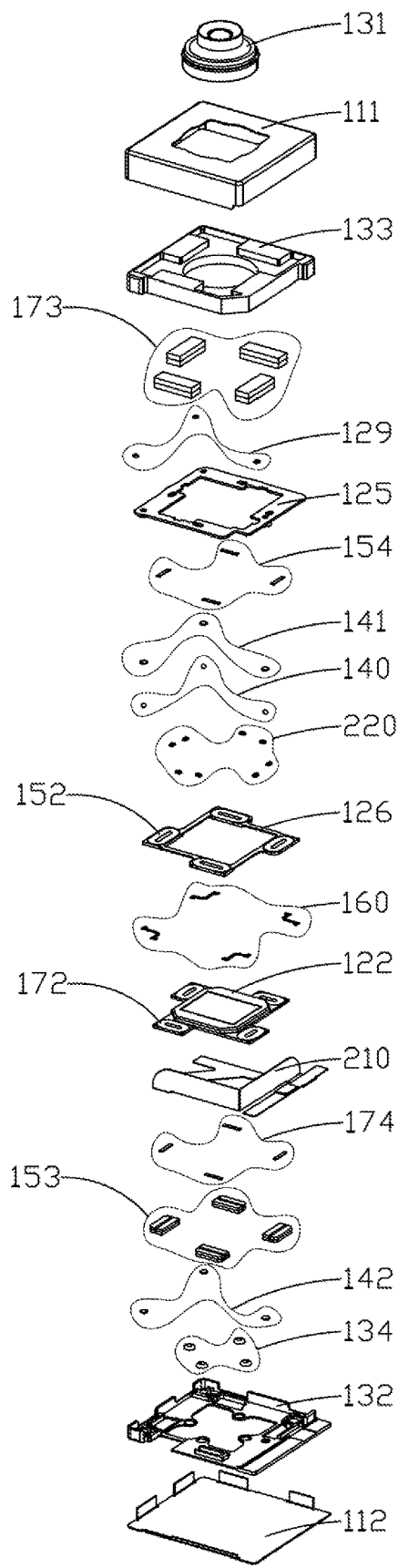
FIG. 2 is an exploded view of an image pickup apparatus provided by some embodiments of the present invention.
Figure 3:
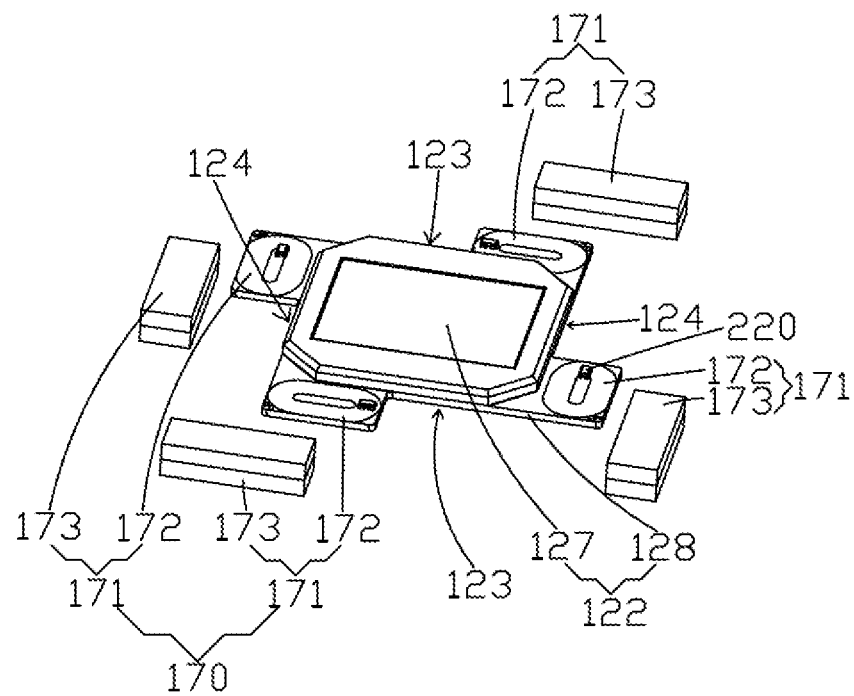
FIG. 3 is an exploded view of some parts of an image pickup apparatus provided by some embodiments of the present invention.
Figure 4:
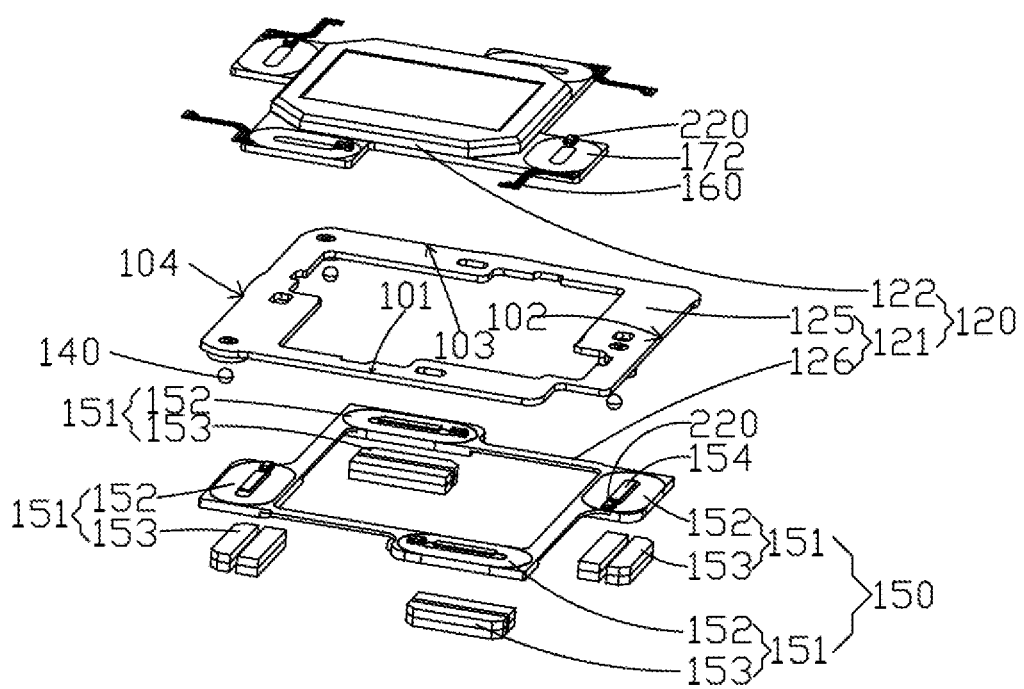
FIG. 4 is an exploded view of some other parts of an image pickup apparatus provided by some embodiments of the present invention.
Figure 5:
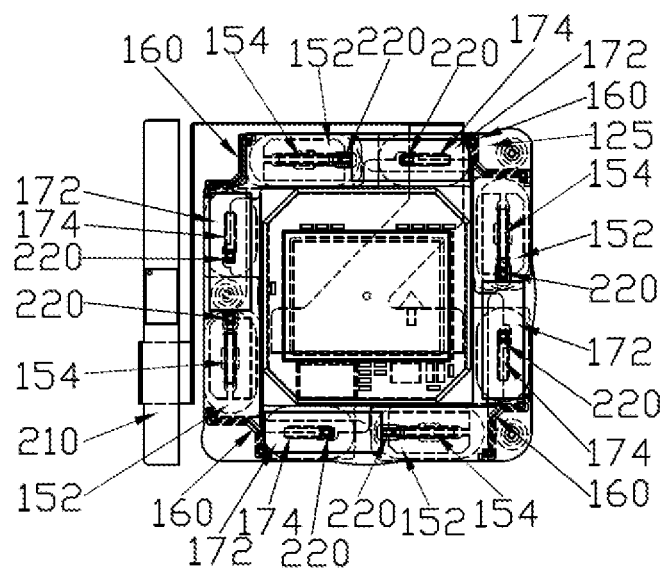
FIG. 5 is a front view of an image pickup apparatus provided by some embodiments of the present invention.
Figure 6:
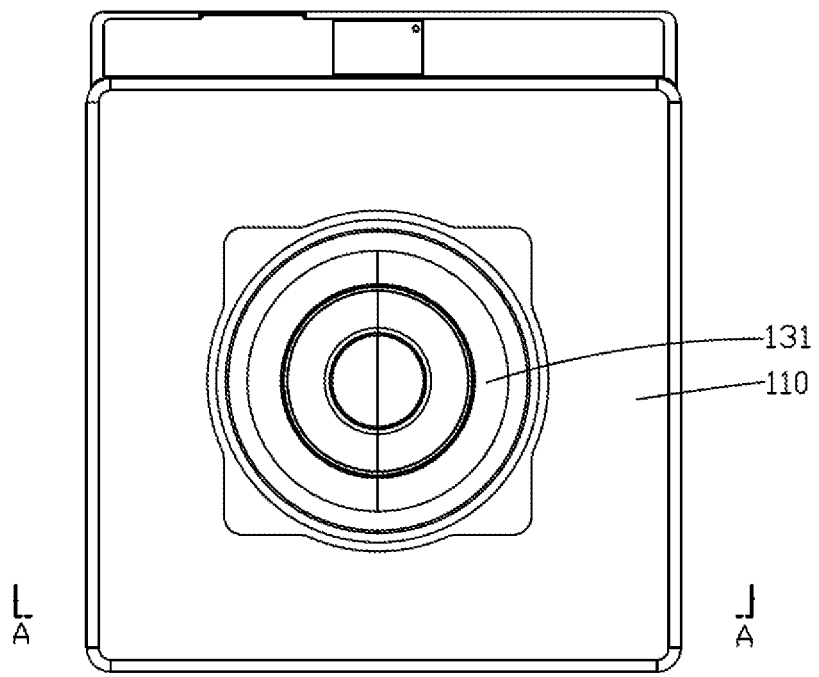
FIG. 6 is a structural diagram of an image pickup apparatus from another perspective provided by some embodiments of the present invention.
Figure 7:
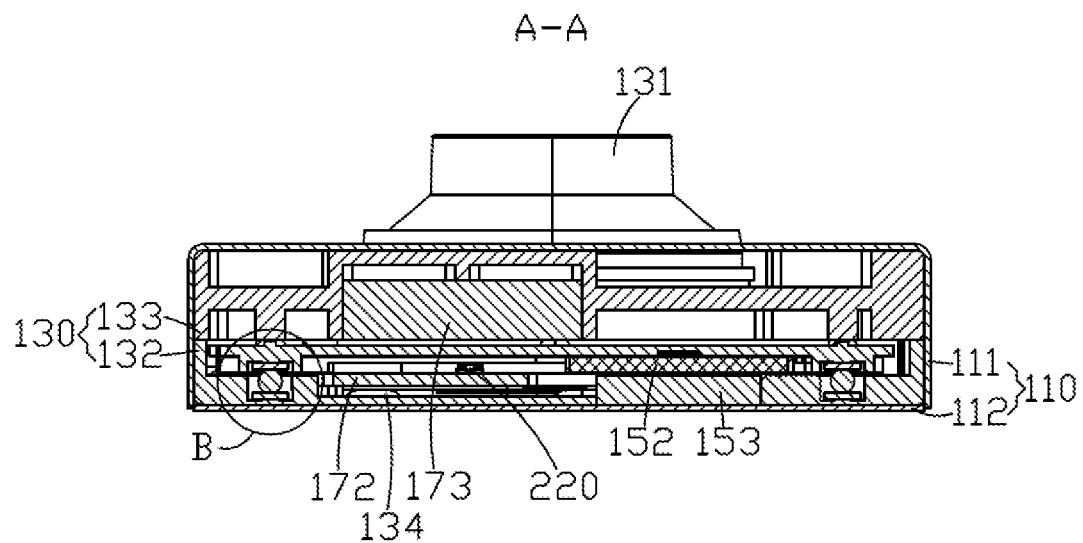
FIG. 7 is a sectional view taken along A-A in FIG. 6.
Figure 8:
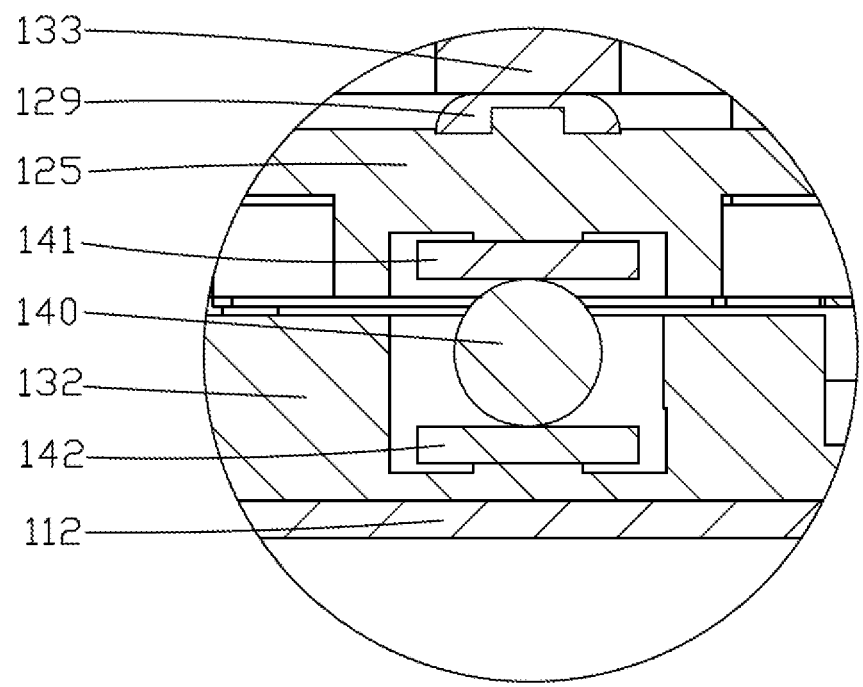
FIG. 8 is a partial enlarged view of part B in FIG. 7.
Figure 9:
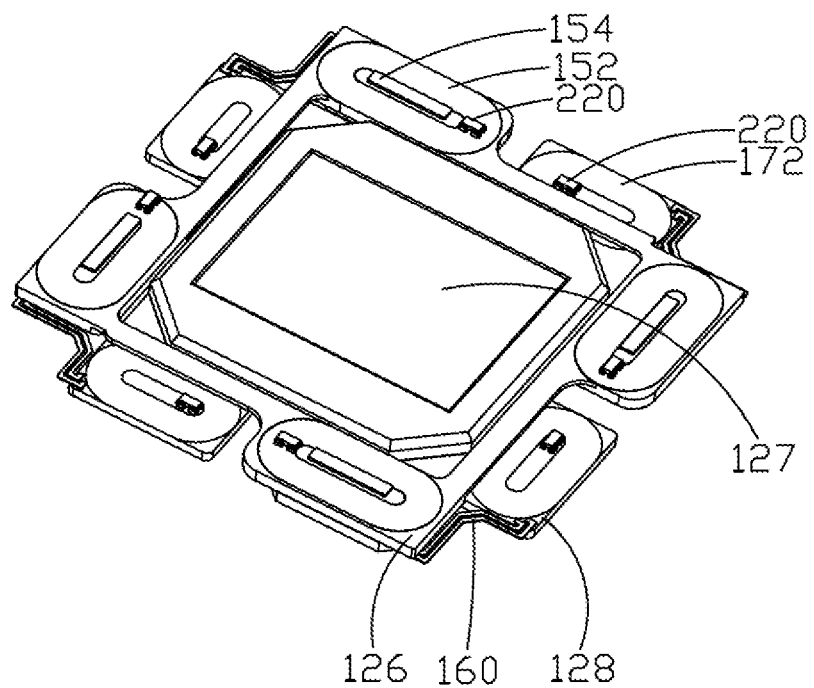
FIG. 9 is a structural diagram of some structures of an image pickup apparatus provided by some embodiments of the present invention.
Figure 17:
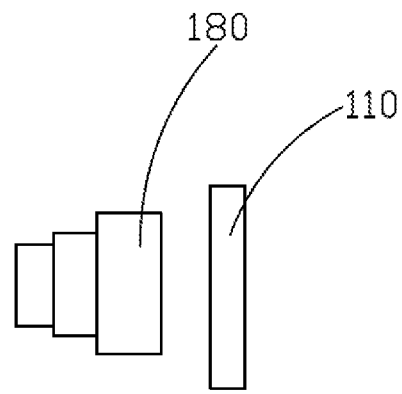
FIG. 17 is a structural diagram of a multi-segment accommodating zoom mechanism and a lens of an image pickup apparatus provided by some embodiments of the present invention.

Still referring to FIG. 2 and also referring to FIG. 17, in some embodiments, the image pickup apparatus further comprises a multi-segment accommodating zoom mechanism 180 fixed on the housing 110. Specifically, the multi-segment accommodating zoom mechanism 180 is used for adjusting a focal length of the lens 131. The multi-segment accommodating zoom mechanism 180 is provided with a plurality of lens barrels arranged in a nested manner, and the plurality of lens barrels can be extended or shortened in the direction of the optical axis, thereby increasing or decreasing the distance between the lens 131 and the sensor component 122 to realize zooming.

Figure 18:
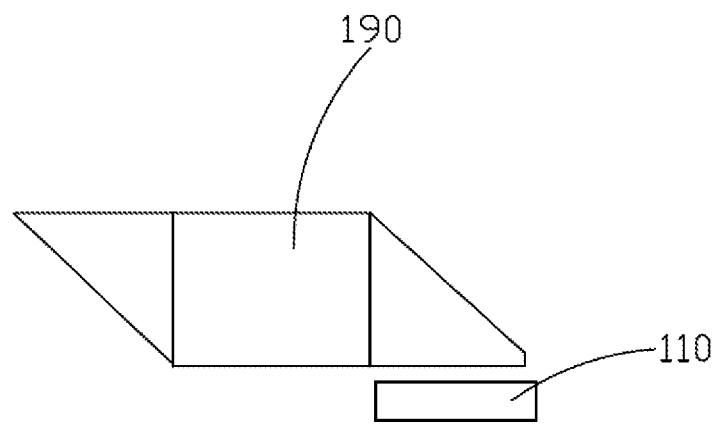
FIG. 18 is a structural diagram of a reflection mechanism and a lens of an image pickup apparatus provided by some embodiments of the present invention.

Referring to FIG. 18, in some embodiments, the image pickup apparatus further comprises a reflection mechanism 190 fixed on the housing 110, wherein the lens 131 changes an optical path through the reflection mechanism 190. Specifically, the reflecting mechanism 190 can be a mechanism with a reflecting mirror, and the reflecting mirror can reflect light to change the optical path.

Figure 19:
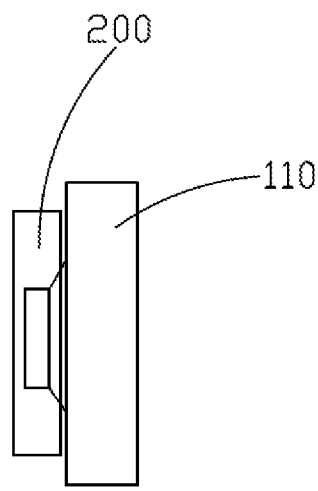
FIG. 19 is a structural diagram of an aperture mechanism and a lens of an image pickup apparatus provided by some embodiments of the present invention.

Referring to FIG. 19, in some embodiments, the image pickup apparatus further comprises an aperture mechanism 200 fixed on the housing 110 and used for adjusting a light inlet amount of the lens 131. In this way, the light inlet amount of the lens 131 can be adjusted through the aperture mechanism 200, thereby changing the brightness of images captured by the image pickup apparatus.

In addition, because in the related art, a lens body of a lens is driven by a driving mechanism to move to realize the anti-shake or zoom function, an image pickup apparatus provided by the related art will cause a change in the position of the center of gravity of the lens during the anti-shake or zoom operation, and it is not suitable for the existing image pickup apparatus to be provided with an aperture mechanism on the lens which can adjust the light inlet amount of the lens. However, in the image pickup apparatus provided by the present invention, the position of the center of gravity of the lens 131 will not change during the anti-shake or zoom operation of the image pickup apparatus, so the aperture mechanism 200 can be installed on the lens 131.

In some embodiments, the present invention provides a camera, comprising an image pickup apparatus. In fact, the image pickup apparatus comprised by the camera provided by the present invention is the same as the image pickup apparatus in the previous embodiment, so the camera provided by the present invention has the same beneficial effects as the image pickup apparatus in the previous embodiment, which will not be repeated here.

Figure 20:
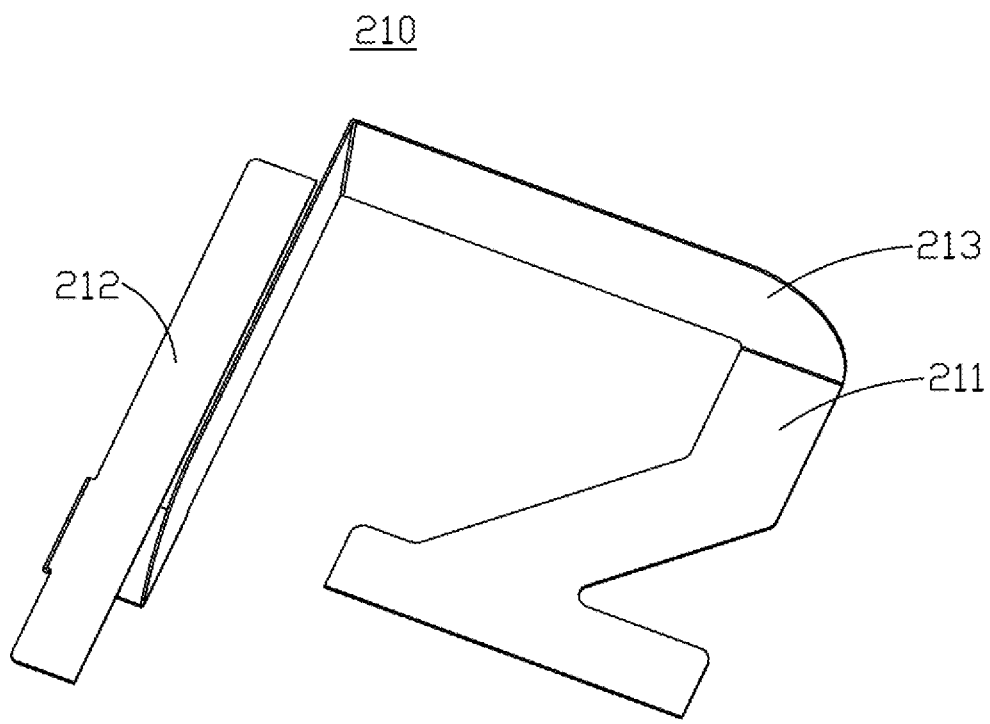
FIG. 20 is a structural diagram of a flexible circuit board provided by some embodiments of the present invention.

Still referring to FIGS. 1-9 and also referring to FIG. 20, in some embodiments, the image pickup apparatus further comprises a flexible circuit board 210. The flexible circuit board 210 has a first conductive end 211, a second conductive end 212, and a body 213 connected with the first conductive end 211 and the second conductive end 212. The first conductive end 211 is located in the housing 110, the second conductive end 212 is located outside the housing 110, and the body 213 surrounds the optical axis and is arranged along a peripheral edge of the sensor component 122 around the optical axis. In this way, power can be supplied to any place in the housing 110 through the first conductive end 211 of the flexible circuit board 210, and the flexible circuit board 210 will not interfere with the sensor component 122 moving under the driving of the first driving component 150 and the second driving component 170. Moreover, the flexible circuit board 210 will not affect the irradiation of the light passing through the lens 131 on an imaging surface of the sensor component 122.

Still referring to FIG. 1-9, in some embodiments, the image pickup apparatus further comprises a position detection member 220 arranged on the sensor component 122. The position detection member 220 is used for detecting the displacement and/or the direction and angle of rotation of the sensor component 122 relative to the lens 131.

In this way, when the sensor component 122 is driven to move and/or rotate relative to the lens 131 by the first driving component 150 and the second driving component 170, the position detection member 220 can be used for detecting the displacement and/or the direction and angle of rotation of the sensor component 122 relative to the lens 131, so as to determine whether the sensor component 122 is driven to a target position by the first driving component 150 and the second driving component 170. In one example, there are a plurality of position detection members 220, and each first driver 152 and each third driver 172 are each provided with one position detection member 220.

Figure 21:
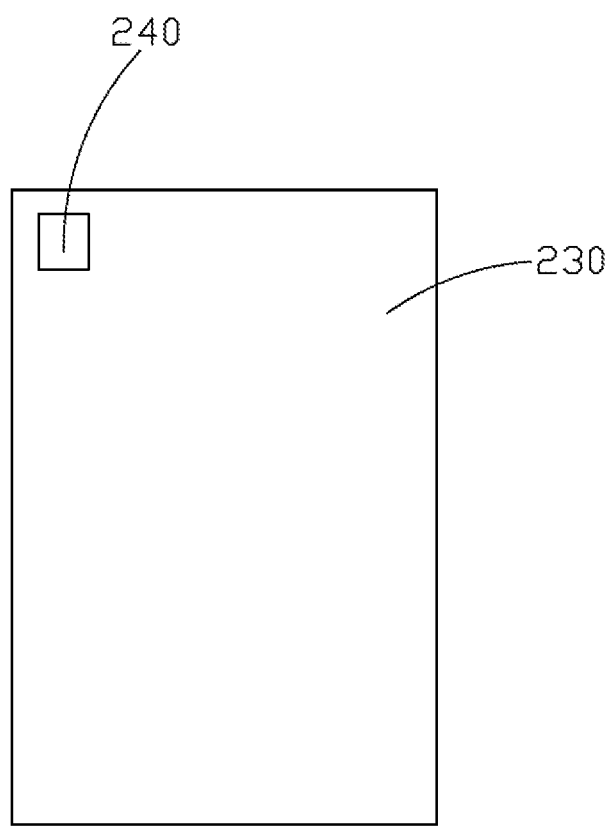
FIG. 21 is a structural diagram of a mobile electronic device according to some embodiments of the present invention.

Referring to FIG. 21, in some embodiments, the present invention provides a mobile electronic device 230 comprising a camera 240. In fact, the camera 240 comprised by the mobile electronic device 230 provided by the present invention is the same as the camera in the above embodiment, and the camera in the above embodiment has the image pickup apparatus in the aforementioned embodiment, so the mobile electronic device 230 provided by the present invention has the same beneficial effects as the image pickup apparatus in the aforementioned embodiment, which are not repeated here.

The specific type of the mobile electronic device 230 is not limited by the present invention. For example, the mobile electronic device 230 may be a mobile phone, a tablet, etc.

The above are only embodiments of the present invention, and it should be pointed out here that for those of ordinary skill in the art, improvements can be made without departing from the inventive concept of the present invention, and all these improvements fall within the protection scope of the present invention.

What is claimed is:

1. An image pickup apparatus, comprising:
   a housing with an accommodating space;
   a movable component accommodated in the housing and a fixed component at least partially accommodated in the housing, the fixed component comprising a lens with an optical axis, and the movable component comprising a moving frame and a sensor component movably connected with the moving frame;
   a first connector movably connecting the movable component with the fixed component;
   a first driving component used for driving the movable component to move in a direction perpendicular to the optical axis and driving the movable component to rotate relative to the fixed component in a direction of the optical axis;
   a second connector movably connecting the moving frame with the sensor component; and
   a second driving component used for driving the sensor component to move in the direction of the optical axis.

2. The image pickup apparatus according to claim 1, wherein the first driving component drives the movable component to move along a first axis and a second axis perpendicular to the optical axis, and the first axis and the second axis are perpendicular to each other.

3. The image pickup apparatus according to claim 1, wherein the housing comprises an upper housing and a lower housing which cooperate to form the accommodation space, the fixed component comprises a base fixed to the lower housing, the first driving component is a voice coil motor and comprises a first coil and a first magnet, the first coil is arranged on the moving frame, and the first magnet is arranged on the base.

4. The image pickup apparatus according to claim 3, wherein the moving frame comprises a moving piece and an anti-shake coil board fixedly connected with the moving piece, and the first connector is a ball and arranged between the moving piece and the base.

5. The image pickup apparatus according to claim 4, wherein the sensor component comprises an optical filter close to the lens and a sensor circuit board spaced apart from the optical filter, the second connector is a leaf spring, and two ends of the second connector are respectively connected with the anti-shake coil board and the sensor circuit board.

6. The image pickup apparatus according to claim 1, wherein the second driving component drives the sensor component to rotate around a first axis and a second axis, and the first axis and the second axis are perpendicular to each other and both perpendicular to the optical axis.

7. The image pickup apparatus according to claim 6, wherein
- the second driving component comprises four second drive actuators, each of the second drive actuators comprises a third driver and a fourth driver arranged on the housing, and the fourth driver is used for allowing the third driver to move in a direction close to/away from the fourth driver; and
- the sensor component has two opposite first side edges and two opposite second side edges, each of the first side edges and each of the second side edges are each provided with one said third driver, the two first side edges are sequentially arranged on the first axis, and the two second side edges are sequentially arranged on the second axis.

8. The image pickup apparatus according to claim 1, wherein the fixed component comprises a lens holder for accommodating at least part of the lens, the second driving component is a voice coil motor and comprises a second coil and a second magnet, the second coil is arranged on the sensor component, and the second magnet is arranged on the lens holder.

9. The image pickup apparatus according to claim 1, further comprising a multi-segment accommodating zoom mechanism fixed on the housing.

10. The image pickup apparatus according to claim 1, further comprising a reflection mechanism fixed on the housing, wherein the lens changes an optical path through the reflection mechanism.

11. The image pickup apparatus according to claim 1, further comprising an aperture mechanism fixed on the housing and used for adjusting a light inlet amount of the lens.

12. A camera, comprising the image pickup apparatus according to claim 1.

13. A mobile electronic device, comprising the camera according to claim 12.

* * * * *